US010125862B2

(12) United States Patent
Kutsubo et al.

(10) Patent No.: US 10,125,862 B2
(45) Date of Patent: Nov. 13, 2018

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Hiroyuki Kutsubo, Nagoya (JP); Kazuki Kojima, Nukata (JP); Koji Makino, Okazaki (JP); Yoshimitsu Hyodo, Nishio (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 386 days.

(21) Appl. No.: 15/108,345

(22) PCT Filed: Jan. 28, 2015

(86) PCT No.: PCT/JP2015/052333
§ 371 (c)(1),
(2) Date: Jun. 27, 2016

(87) PCT Pub. No.: WO2015/115470
PCT Pub. Date: Aug. 6, 2015

(65) Prior Publication Data
US 2016/0334013 A1 Nov. 17, 2016

(30) Foreign Application Priority Data

Jan. 31, 2014 (JP) ................. 2014-018005

(51) Int. Cl.
*F16H 3/66* (2006.01)
*F16H 61/00* (2006.01)
(Continued)

(52) U.S. Cl.
CPC ........... *F16H 61/068* (2013.01); *F16H 3/663* (2013.01); *F16H 61/061* (2013.01); *F16H 61/14* (2013.01);
(Continued)

(58) Field of Classification Search
CPC ................. F16H 61/068; F16H 2200/006
See application file for complete search history.

(56) References Cited

U.S. PATENT DOCUMENTS 5,058,461 A * 10/1991 Shimei .................. F16H 61/061
477/150
5,062,321 A * 11/1991 Koenig .................. F16H 61/061
477/155
(Continued)

FOREIGN PATENT DOCUMENTS

JP  H03-103662 A  4/1991
JP  H07-217731 A  8/1995
(Continued)

OTHER PUBLICATIONS

Mar. 31, 2015 International Search Report issued in International Patent Application No. PCT/JP2015/052333.

*Primary Examiner* — Terence Boes
(74) *Attorney, Agent, or Firm* — Oliff PLC

(57) ABSTRACT

A hydraulic control device with a second oil passage check valve provided in the second oil passage between a connection portion with the first oil passage and the second solenoid valve, the second oil passage check valve being configured such that a hydraulic pressure is supplied in a direction from the second solenoid valve toward the first oil passage and a hydraulic pressure is not supplied in the opposite direction.

19 Claims, 5 Drawing Sheets

(51) Int. Cl.
*F16H 61/06* (2006.01)
*F16H 61/14* (2006.01)
*F16H 61/686* (2006.01)

(52) U.S. Cl.
CPC .......... *F16H 3/666* (2013.01); *F16H 61/0021* (2013.01); *F16H 61/686* (2013.01); *F16H 2200/006* (2013.01); *F16H 2200/2012* (2013.01); *F16H 2200/2046* (2013.01); *F16H 2200/2066* (2013.01); *F16H 2200/2082* (2013.01); *F16H 2200/2097* (2013.01)

(56) References Cited

U.S. PATENT DOCUMENTS

| | | | | |
|---|---|---|---|---|
| 5,188,006 | A | * | 2/1993 | Goto ............... F16H 61/061 477/133 |
| 5,443,595 | A | * | 8/1995 | Shimei ............. F16H 61/08 477/155 |
| 5,536,221 | A | * | 7/1996 | Lee ................. F16H 61/065 477/143 |
| 5,895,334 | A | | 4/1999 | Yu |
| 7,951,034 | B2 | | 5/2011 | Shimizu et al. |
| 2016/0230879 | A1 | * | 8/2016 | Hirai ............... F16H 61/686 |

FOREIGN PATENT DOCUMENTS

| | | |
|---|---|---|
| JP | H10-89452 A | 4/1998 |
| JP | H10-141488 A | 5/1998 |
| JP | 2002-266996 A | 9/2002 |
| JP | 2009-133437 A | 6/2009 |

\* cited by examiner

FIG. 2

|     | C-1 | C-2 | C-3 | C-4 | B-1 | B-2 | F-1 |
|-----|-----|-----|-----|-----|-----|-----|-----|
| P   |     |     |     |     |     |     |     |
| R   |     |     | O   |     |     | O   |     |
| N   |     |     |     |     |     |     |     |
| 1st | O   |     |     |     |     | (O) | O   |
| 2nd | O   |     |     |     | O   |     |     |
| 3rd | O   |     | O   |     |     |     |     |
| 4th | O   |     |     | O   |     |     |     |
| 5th | O   | O   |     |     |     |     |     |
| 6th |     | O   |     | O   |     |     |     |
| 7th |     | O   | O   |     |     |     |     |
| 8th |     | O   |     |     | O   |     |     |

※ (O): ENGINE BRAKE IN OPERATION

HYDRAULIC CONTROL DEVICE FOR AUTOMATIC TRANSMISSION

BACKGROUND

The present technology relates to a hydraulic control device for an automatic transmission to be mounted on vehicles such as automobiles, for example.

There has hitherto been proposed a technology in which a circuit that supplies a hydraulic pressure to a solenoid valve that engages and disengages a clutch to establish a first speed in a forward (drive: D) range and a reverse speed in a reverse (reverse: R) range is provided with an accumulator to mitigate a shock caused when range switching is made between a travel range such as the D range and the R range and a non-travel range such as a neutral (N) range (see Japanese Patent Application Publication No. 2009-133437, for example).

SUMMARY

If the accumulator is installed in the circuit which supplies a hydraulic pressure to the solenoid valve as discussed above, however, an increase in size of the device is unavoidable.

An exemplary aspect of the present disclosure provides an automatic transmission that can mitigate a shock caused when switching is made from a travel range to a non-travel range without providing an accumulator.

The hydraulic control device for an automatic transmission according to an exemplary aspect of the disclosure includes a range pressure switcher that outputs a source pressure based on a hydraulic pressure from a hydraulic pressure generation source as a travel range pressure in the case where switching is made to a travel range, and that does not output the travel range pressure in the case where switching is made to a non-travel range; a first oil passage through which the travel range pressure output from the range pressure switcher passes; a first solenoid valve connected to the first oil passage, the first solenoid valve regulating the travel range pressure and supplying the regulated pressure to a hydraulic servo for a friction engagement element to engage the friction engagement element in the case where switching is made from the non-travel range to the travel range, and the first solenoid valve regulating the travel range pressure and discharging the regulated pressure from the hydraulic servo to disengage the friction engagement element in the case where switching is made from the travel range to the non-travel range; a first oil passage orifice provided in the first oil passage between the range pressure switcher and the first solenoid valve; a second oil passage connected to the first oil passage between the first solenoid valve and the first oil passage orifice; a second solenoid valve that outputs a hydraulic pressure generated at least in the non-travel range when switching is made from the travel range to the non-travel range, and that can supply the hydraulic pressure to the first solenoid valve via the second oil passage; and a second oil passage check valve provided in the second oil passage between a connection portion with the first oil passage and the second solenoid valve, the second oil passage check valve being configured such that a hydraulic pressure is supplied in a direction from the second solenoid valve toward the first oil passage and a hydraulic pressure is not supplied in the opposite direction Consequently, the second solenoid valve can supply a hydraulic pressure to the first solenoid valve when switching is made from the travel range to the non-travel range.

Therefore, it is possible to mitigate a shock caused when switching is made from the travel range to the non-travel range without providing an accumulator. Since it is not necessary to provide an accumulator, the device can be downsized. In addition, the second oil passage is connected between the first solenoid valve and the first oil passage orifice. Therefore, a hydraulic pressure from the second solenoid valve can be mainly supplied to the first solenoid valve. Furthermore, the second oil passage check valve is provided in the second oil passage between the connection portion with the first oil passage and the second solenoid valve. Therefore, it is possible to prevent oil from flowing from the first oil passage to the second oil passage in the case where a hydraulic pressure is supplied from the hydraulic pressure generation source to the first solenoid valve via the first oil passage.

BRIEF DESCRIPTION OF THE DRAWINGS

FIG. 2 is an engagement table of the automatic transmission according to the first embodiment.

DETAILED DESCRIPTION OF EMBODIMENTS

First Embodiment

Figure 1:
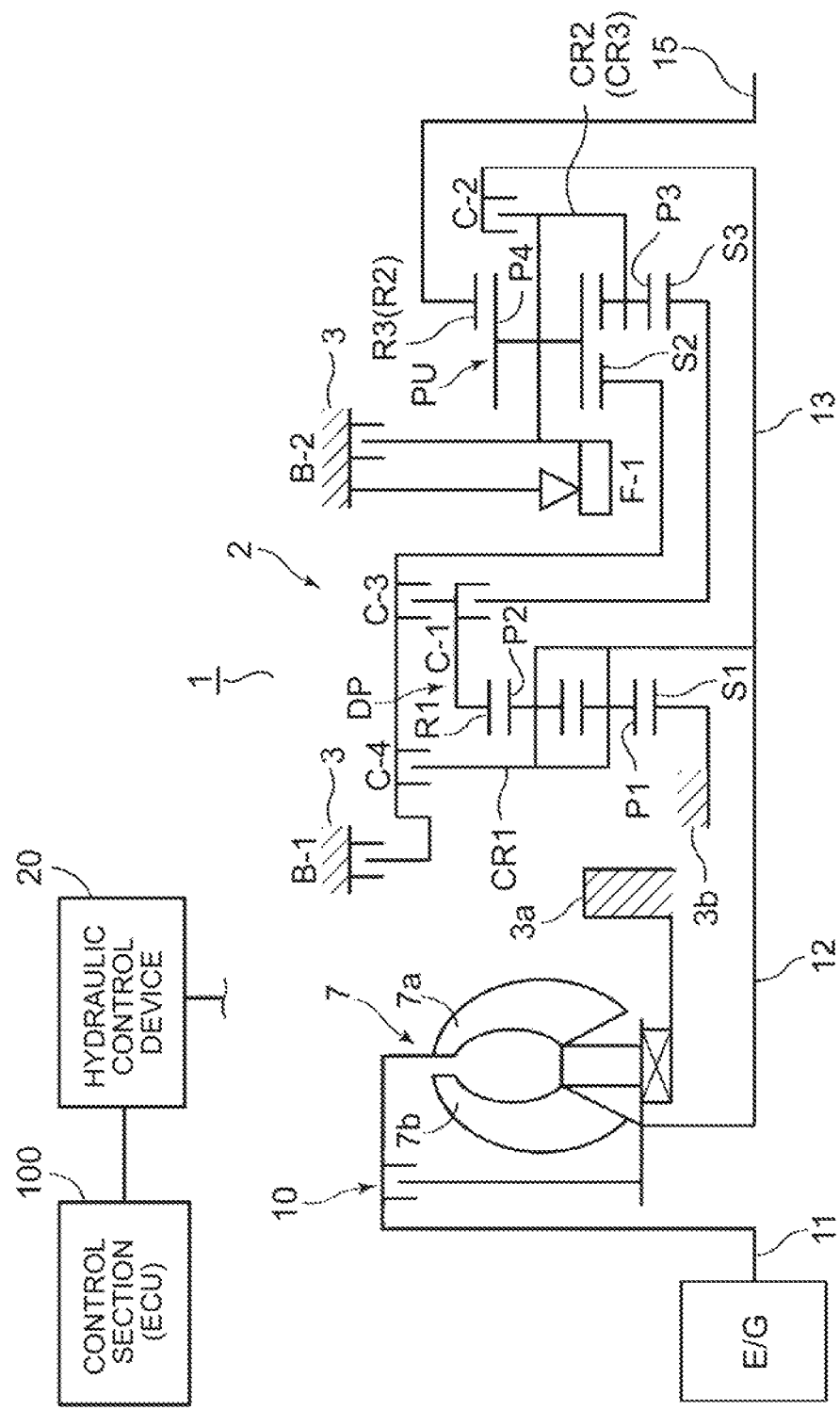
FIG. 1 is a skeleton diagram illustrating an automatic transmission according to a first embodiment.

A first embodiment will be described below with reference to FIGS. 1 to 4. First, a schematic configuration of an automatic transmission 1 will be described with reference to FIG. 1. As illustrated in FIG. 1, the automatic transmission 1, which is suitable for use in front-engine rear-drive (FR) vehicles, for example, has an input shaft 11 that is connectable to a crankshaft (output shaft) of an engine (E/G, drive source), includes a torque converter (fluid transmission apparatus) 7 and a speed change mechanism (automatic speed change mechanism) 2 centered on the axis of the input shaft 11, and can change the speed of rotational power transferred from the engine. In the embodiment, the present disclosure is applied to FR vehicles. However, the present disclosure is not limited thereto, and may also be applied to front-engine front-drive (FF) vehicles, for example.

The torque converter 7 is disposed in a power transfer path between the output shaft (input shaft 11) of the engine and an input shaft 12 of the speed change mechanism 2, and has a pump impeller 7a connected to the input shaft 11 of the automatic transmission 1 and a turbine runner 7b to which rotation of the pump impeller 7a is transferred via an operation fluid. The turbine runner 7b is connected to the input shaft 12 of the speed change mechanism 2 which is disposed coaxially with the input shaft 11. The torque converter 7 also includes a lock-up clutch 10 that is capable of locking up rotations input to and output from the torque converter 7. When the lock-up clutch 10 is engaged, rotation of the input shaft 11 of the automatic transmission 1 is directly transferred to the input shaft 12 of the automatic speed change mechanism 2.

The speed change mechanism 2 includes a planetary gear DP and a planetary gear unit PU provided on the input shaft 12 (and an intermediate shaft 13). The planetary gear DP is a so-called double-pinion planetary gear, which includes a sun gear S1, a carrier CR1, and a ring gear R1 and in which the carrier CR1 has a pinion P1 meshed with the sun gear S1 and a pinion P2 meshed with the ring gear R1 such that the carrier CR1 meshes with both the pinion P1 and the pinion P2.

The planetary gear unit PU is a so-called Ravigneaux type planetary gear, which includes four rotary elements, namely a sun gear S2, a sun gear S3, a carrier CR2 (CR3), and a ring gear R3 (R2), and in which the carrier CR2 has a long pinion P4 meshed with the sun gear S2 and the ring gear R3 and a short pinion P3 meshed with the long pinion P4 and the sun gear S3 such that the carrier CR2 meshes with both the long pinion P4 and the short pinion P3.

The sun gear S1 of the planetary gear DP is connected to a boss portion 3b integrally fixed to a transmission case 3, for example, so as not to be rotatable. The boss portion 3b is provided to extend from an oil pump body 3a. In addition, the carrier CR1 is connected to the input shaft 12 so as to be rotatable at the same speed as rotation of the input shaft 12 (hereinafter referred to as "input rotation"). The carrier CR1 is also connected to a fourth clutch C-4. Furthermore, the ring gear R1 is rotated at a speed reduced compared to the speed of the input rotation by the sun gear S1 which is stationary and the carrier CR1 which makes the input rotation. The ring gear R1 is connected to a first clutch C-1 and a third clutch C-3. The first clutch C-1 forms a transfer path together with other clutches and brakes.

The sun gear S2 of the planetary gear unit PU is connected to a first brake B-1 so as to be held stationary to the transmission case 3. The sun gear S2 is also connected to the fourth clutch C-4 and the third clutch C-3 so as to receive the input rotation of the carrier CR1 via the fourth clutch C-4 and the reduced-speed rotation of the ring gear R1 via the third clutch C-3. In addition, the sun gear S3 is connected to the first clutch C-1 so as to receive the reduced-speed rotation of the ring gear R1.

Furthermore, the carrier CR2 is connected to a second clutch C-2, to which rotation of the input shaft 12 is input via the intermediate shaft 13, so as to selectively receive the input rotation via the second clutch C-2. The carrier CR2 is also connected to a one-way clutch F-1 and a second brake B-2 such that the rotation of the carrier CR2 is restricted to one direction with respect to the transmission case 3 via the one-way clutch F-1 and so as to be held stationary (unrotatable) via the second brake B-2. The ring gear R3 is connected to an output shaft 15 that outputs rotation to drive wheels (not illustrated).

In the automatic transmission 1 configured as described above, the clutches C-1 to C-4, the brakes B-1 and B-2, and the one-way clutch F-1 illustrated in the skeleton diagram of FIG. 1 are engaged and disengaged in combinations indicated in the engagement table of FIG. 2 to establish one of a first forward speed (1st) to an eighth forward speed (8th) in a drive (D) range (position), a first reverse speed (R) in a reverse (R) range, a parking (P) range, and a neutral (N) range.

Next, the configuration of a hydraulic control device 20 for the automatic transmission 1 discussed above will be described with reference to FIGS. 3 and 4 with a particular focus on a portion that controls the first clutch C-1 (friction engagement element) which is engaged to establish the first forward speed. In the embodiment, in order to describe the position of a spool, the terms "right-half position" and "left-half position" are used to refer to the respective positions of the right half and the left half of the spool illustrated in FIG. 3.

Figure 3:
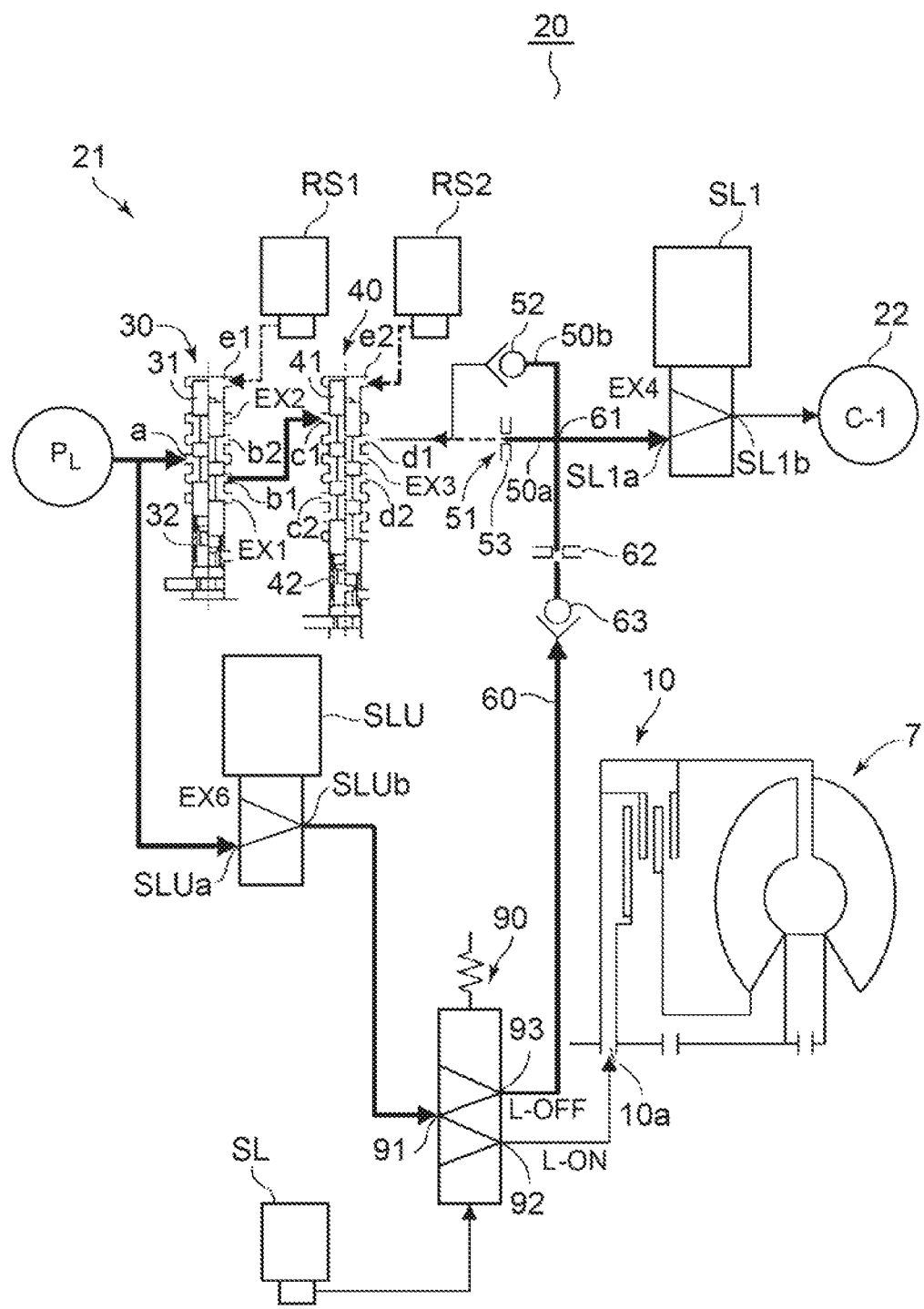
FIG. 3 is a schematic diagram illustrating a part of a hydraulic control device for the automatic transmission according to the first embodiment.

As illustrated in FIG. 3, the hydraulic control device 20 includes a range switching device 21, linear solenoid valves SL1 and SLU, a hydraulic servo 22 that engages and disengages the first clutch C-1, a solenoid valve SL, a lock-up relay valve 90, and so forth. The range switching device 21 (range pressure switcher) is composed of first and second solenoid valves RS1 and RS2, a first switching valve 30 switched by the first solenoid valve RS1, a second switching valve 40 switched by the second solenoid valve RS2, and so forth. The first and second solenoid valves RS1 and RS2 are controlled on the basis of a control signal from a control section (ECU) 100 (FIG. 1) that generates a control signal on the basis of a shift signal from a shift lever (not illustrated) used by a driver to select one of the parking (P) range and the neutral (N) range, which are non-travel ranges, the drive (D) range and the reverse (R) range, which are travel ranges, and so forth. In the range switching device 21 according to the embodiment, one of the ranges is selected using the shift lever through a shift-by-wire system in which the shift signal and the control signal described above are provided via an electric signal. However, one of the ranges may be selected by operating a button, for example.

The first and second solenoid valves RS1 and RS2 output a control pressure by regulating a line pressure $P_L$ (source pressure) based on a hydraulic pressure generated by an oil pump (hydraulic pressure generation source) (not illustrated) rotationally driven by the engine. The first solenoid valve RS1 is of a so-called normally closed type that does not output a control pressure when not energized. The second solenoid valve RS2 is of a so-called normally open type that outputs a control pressure when not energized.

The first switching valve 30 has a spool 31 that is movable between a first position which is the left-half position in the drawing and a second position which is the right-half position in the drawing, and a spring 32 that serves as an urging member that urges the spool 31 toward the first position. The first switching valve 30 also has an input port a, a first output port b1, a second output port b2, a control port e1, and a plurality of drain ports EX1 and EX2.

The input port a is supplied with the line pressure $P_L$. The first output port b1 communicates with the input port a with the spool 31 at the first position (left-half position), and does not communicate with the input port a with the spool 31 at the second position (right-half position). The second output port b2 does not communicate with the input port a with the spool 31 at the first position (left-half position), and communicates with the input port a with the spool 31 at the second position (right-half position). In addition, with the spool 31 at the first position, the second output port b2 and the drain port EX2 communicate with each other so that oil in the second output port b2 is drained. In addition, with the spool 31 at the second position, the first output port b1 and the drain port EX1 communicate with each other so that oil in the first output port b1 is drained. The control port e1 receives a control pressure output from the first solenoid valve RS1 so that the input control pressure acts on the spool 31.

The second switching valve 40 has a spool 41 that is movable between a first position which is the left-half position in the drawing and a second position which is the right-half position in the drawing, and a spring 42 that serves as an urging member that urges the spool 41 toward the first position. The second switching valve 40 also has a first input port c1, a second input port c2, a first output port d1, a second output port d2, a control port e2, and a drain port EX3.

The first input port e1 is connected to the first output port b1 of the first switching valve 30. The second input port c2 is connected to the second output port b2 of the first switching valve 30. The first output port d1 communicates with the first input port c1 with the spool 41 at the first position (left-half position), and does not communicate with the first input port c1 with the spool 41 at the second position (right-half position). The second output port d2 does not communicate with the second input port c2 with the spool 41 at the first position (left-half position), and communicates with the second input port c2 with the spool 41 at the second position (right-half position). In addition, with the spool 41 at the first position, the second output port d2 and the drain port EX3 communicate with each other so that oil in the second output port d2 is drained. In addition, with the spool 41 at the second position, the first output port d1 and the drain port EX3 communicate with each other so that oil in the first output port d1 is drained. The control port e2 receives a control pressure output from the second solenoid valve RS2 so that the input control pressure acts on the spool 41.

In the case where the driver operates the shift lever to the D range which is a travel range, both the first solenoid valve RS1 and the second solenoid valve RS2 are turned off so that both the first switching valve 30 and the second switching valve 40 are switched to the first position (left-half position). Then, the line pressure $P_L$ which has been supplied to the input port a of the first switching valve 30 is regulated, output from the first output port b1, and supplied to the first input port c1 of the second switching valve 40. A D range pressure (travel range pressure) is output from the first output port d1 of the second switching valve 40.

Figure 5:
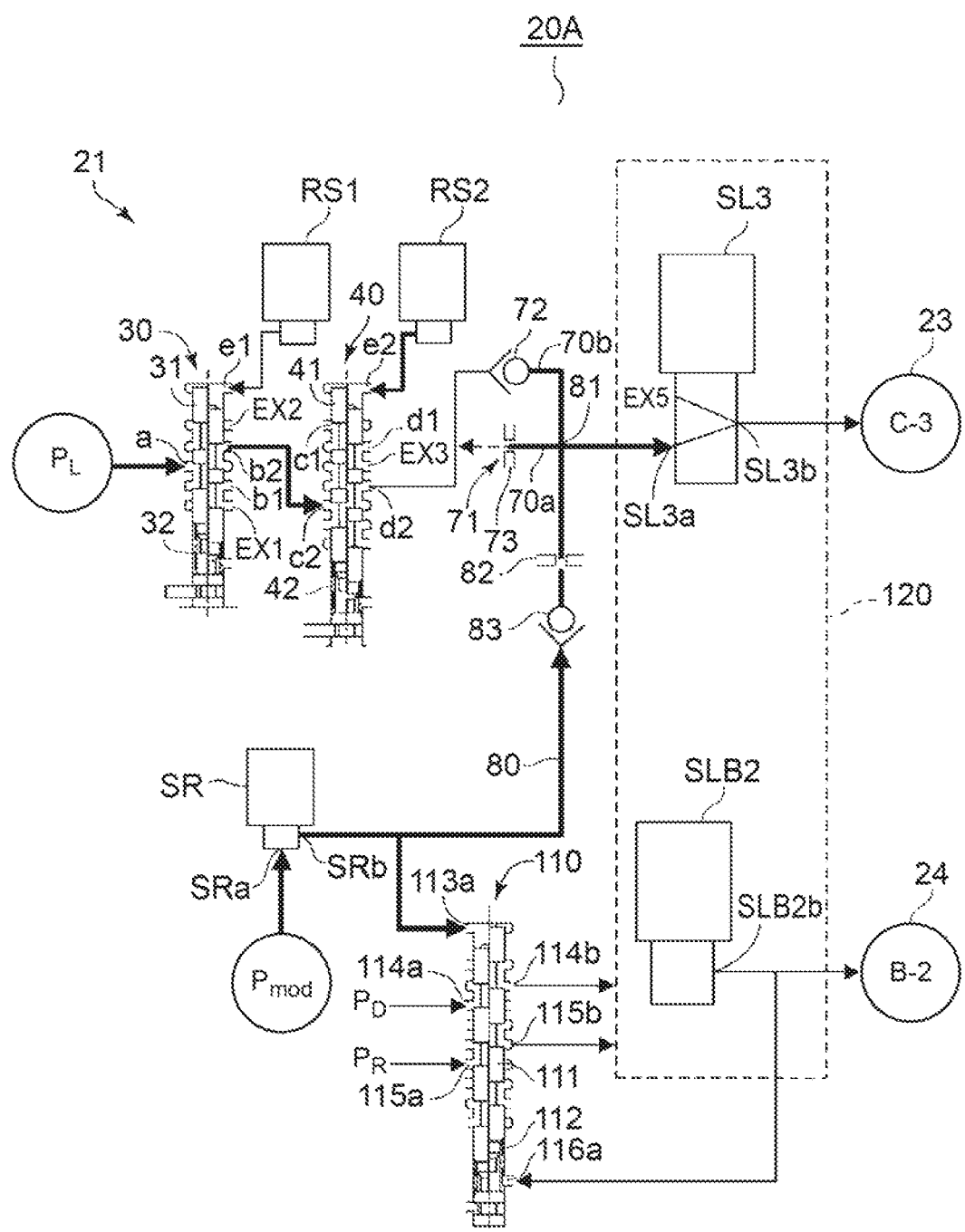
FIG. 5 is a schematic diagram illustrating a part of a hydraulic control device for an automatic transmission according to a second embodiment.

In the case where the driver operates the shift lever to the R range, on the other hand, both the first solenoid valve RS1 and the second solenoid valve RS2 are turned on so that both the first switching valve 30 and the second switching valve 40 are switched to the second position (right-half position), Then, as illustrated in FIG. 5 for a second embodiment to be discussed later, the line pressure $P_L$ which has been supplied to the input port a of the first switching valve 30 is regulated, output from the second output port b2, and supplied to the second input port c2 of the second switching valve 40. An R range pressure is output from the second output port d2 of the second switching valve 40.

The thus output D range pressure or R range pressure is supplied to hydraulic servos for the clutches and the brakes via a linear solenoid valve or the like to establish one of the first forward speed (1st) to eighth forward speed (8th) in the D range and the first reverse speed (R) in the R range discussed above.

In the case where the driver operates the shift lever from the D range to the N range which is a non-travel range, the first solenoid valve RS1 is turned off and the second solenoid valve RS2 is turned on so that the first switching valve 30 is switched to the first position (left-half position) and the second switching valve 40 is switched to the second position (right-half position). Then, the line pressure $P_L$ which has been supplied to the input port a of the first switching valve 30 is output from the first output port b1, and supplied to the first input port c1 of the second switching valve 40. In the second switching valve 40, the first input port c1 and the first output port d1 do not communicate with each other, and the first output port d1 and the drain port EX3 communicate with each other. Therefore, the D range pressure which has been supplied to the linear solenoid valve SL1 to be discussed later is discharged from the drain port EX3 via the first output port d1 so that the D range pressure is not output.

In the case where the driver operates the shift lever from the D range to the P range which is a non-travel range, the first solenoid valve RS1 is turned on and the second solenoid valve RS2 is turned off so that the first switching valve 30 is switched to the second position (right-half position) and the second switching valve 40 is switched to the first position (left-half position). Then, the line pressure $P_L$ which has been supplied to the input port a of the first switching valve 30 is output from the second output port b2, and supplied to the second input port c2 of the second switching valve 40. In the second switching valve 40, the second input port c2 and the second output port d2 do not communicate with each other, and the first output port d1 and the first input port c1 communicate with each other. In addition, the first output port b1 of the first switching valve 30 which is connected to the first input port c1 communicates with the drain port EX1. Therefore, the D range pressure which has been supplied to the linear solenoid valve SL1 is discharged from the drain port EX1 via the first output port d1, the first input port c1, and the first output port b1 so that the D range pressure is not output.

In the case where the first solenoid valve RS1 and the second solenoid valve RS2 are subjected to an off failure because of a wire breakage or the like, the range switching device 21 is switched to the N range since the first solenoid valve RS1 is of a normally closed type and the second solenoid valve RS2 is of a normally open type, and neither the D range pressure nor the R range pressure is output from the range switching device 21.

The linear solenoid valve SL1 (first solenoid valve) has an input port SL1a that receives the D range pressure, an output port SL1b that regulates the D range pressure and outputs the regulated pressure to the hydraulic servo 22 when energized, and a drain port EX4. In the case where switching is made to the D range and one of the first to fifth forward speeds is established, the linear solenoid valve SL1 is energized, and regulates the D range pressure and supplies the regulated pressure to the hydraulic servo 22 to engage the first clutch C-1. In the case where switching is made to the N range or the P range, on the other hand, the linear solenoid valve SL1 regulates the D range pressure and discharges the regulated pressure from the hydraulic servo 22 to disengage the first clutch C-1.

The linear solenoid valve SLU (second solenoid valve, lock-up solenoid valve) has an input port SLUa that receives the line pressure $P_L$, an output port SLUb that regulates the line pressure $P_L$ and outputs the regulated pressure when energized, and a drain port EX6. The output port SLUb is connected to the lock-up relay valve 90 (lock-up control valve). The lock-up relay valve 90 is connected to an input port 10a of the lock-up clutch 10. Operation of the lock-up relay valve engages and disengages the lock-up clutch. That is, the lock-up relay valve 90 includes an input port 91 and output ports 92 and 93, can supply a supplied hydraulic pressure to the lock-up clutch 10, and can be switched between a first state in which the lock-up clutch 10 is engaged and a second state in which the lock-up clutch 10 is disengaged.

Specifically, the lock-up relay valve 90 can be switched between the first state (L-ON), in which a supplied hydraulic pressure is output as an engagement pressure to engage the lock-up clutch 10, and the second state (L-OFF), in which a supplied hydraulic pressure is not supplied to the lock-up clutch 10 to disengage the lock-up clutch 10, in accordance with whether or not a hydraulic pressure is output from the solenoid valve SL. For example, the lock-up relay valve 90 is switched to the first state, in which the input port 91 and the output port 92 communicate with each other, in the case where a hydraulic pressure is output from the solenoid valve SL, and switched to the second state, in which the input port 91 and the output port 93 communicate with each other, in the case where a hydraulic pressure is not output from the solenoid valve SL. In addition, the output port 92 is connected to the input port 10a of a working oil chamber of the lock-up clutch 10.

In the embodiment, the output port SLUb of the linear solenoid valve SLU and the input port 91 of the lock-up relay valve 90 are connected to each other. That is, the linear solenoid valve SLU can supply a hydraulic pressure to the lock-up relay valve 90. Thus, when the lock-up relay valve 90 is in the first state, a hydraulic pressure output from the linear solenoid valve SLU and supplied to the lock-up relay valve 90 is output as an engagement pressure to engage the lock-up clutch 10. In FIG. 3, the lock-up clutch 10 is a multi-plate clutch. However, the lock-up clutch 10 may be a single-plate clutch, Both the linear solenoid valve SL1 and the linear solenoid valve SLU are of a so-called normally closed type that does not output a hydraulic pressure when not energized.

A first oil passage 50a is disposed between the range switching device 21 and the linear solenoid valve SL1 discussed above. That is, the first oil passage 50a is connected to the second output port d1 of the second switching valve 40 of the range switching device 21 and the input port SL1a of the linear solenoid valve SL1. Therefore, the D range pressure output from the range switching device 21 is supplied to the linear solenoid valve SL1 through the first oil passage 50a, The first oil passage 50a is provided with a first oil passage orifice 53. In addition, a bypass oil passage 50b (third oil passage) is provided between the range switching device 21 and the linear solenoid valve SL1. The bypass oil passage 50b extends in parallel with the first oil passage 50a to bypass the first oil passage orifice 53. That is, both end portions of the bypass oil passage 50b are connected to the first oil passage 50a on both sides of the first oil passage orifice 53, The bypass oil passage 50b is provided with a first oil passage check valve 52 through which a hydraulic pressure is supplied in the direction from the range switching device 21 toward the linear solenoid valve SL1 and through which a hydraulic pressure is not supplied in the opposite direction.

By providing a delay mechanism 51 that has the first oil passage orifice 53 and the first oil passage check valve 52 between the range switching device 21 and the linear solenoid valve SL1 in this way, pressure variations are delayed in the case where the D range pressure is discharged from the linear solenoid valve SL1 compared to a case where the D range pressure is supplied to the linear solenoid valve SL1. Consequently, in the case where a hydraulic pressure is supplied from the range switching device 21 to the linear solenoid valve SL1, a hydraulic pressure is mainly supplied to the linear solenoid valve SL1 side via the bypass oil passage 50b which is provided with the first oil passage check valve 52. In the case where a hydraulic pressure is discharged from the linear solenoid valve SL1 to the range switching device 21, on the other hand, a hydraulic pressure is not discharged from the bypass oil passage 50b because of the first oil passage check valve 52, and a hydraulic pressure is discharged from the first oil passage 50a to the range switching device 21 side with the flow rate reduced by the first oil passage orifice 53. With the hydraulic pressure passing through the first oil passage 50a which is provided with the first oil passage orifice 53 in this way, it is possible to prevent an abrupt loss of hydraulic pressure in the hydraulic servo 22.

In addition, a second oil passage 60 is connected to the first oil passage 50a between the linear solenoid valve SL1 and the delay mechanism 51. The second oil passage 60 is also connected to the linear solenoid valve SLU via the lock-up relay valve 90. That is, the second oil passage 60 is connected to the output port 93 of the lock-up relay valve 90, and the input port 91 of the lock-up relay valve 90 is connected to the output port SLUb of the linear solenoid valve SLU. Additionally, the second oil passage 60 is connected to the first oil passage 50a by a connection portion 61. Thus, when the lock-up relay valve 90 is in the second state, a hydraulic pressure output by the linear solenoid valve SLU by regulating the line pressure $P_L$ can be supplied to the linear solenoid valve SL1 via the second oil passage 60, the connection portion 61, and the first oil passage 50a. Therefore, a hydraulic pressure output from the linear solenoid valve SLU is output as an engagement pressure for the lock-up clutch 10 when the lock-up relay valve 90 is in the first state, and supplied to the linear solenoid valve SL1 via the second oil passage 60 etc. when the lock-up relay valve 90 is in the second state. The hydraulic pressure is also supplied to the range switching device 21 side from the connection portion 61 via the first oil passage 50a. Since the flow rate is reduced by the first oil passage orifice 53 with the delay mechanism 51 discussed above provided between the connection portion 61 and the range switching device 21, however, the hydraulic pressure is mainly supplied to the linear solenoid valve SL1.

In addition, a second oil passage orifice 62 and a second oil passage check valve 63 are provided in the second oil passage 60 between the connection portion 61 with the first oil passage 50a and the linear solenoid valve SLU, sequentially from the connection portion 61 side. The second oil passage check valve 63 is configured such that a hydraulic pressure is supplied in the direction from the linear solenoid valve SLU toward the first oil passage 50a and a hydraulic pressure is not supplied in the opposite direction. Thus, a hydraulic pressure supplied from the linear solenoid valve SLU is supplied to the first oil passage 50a side via the second oil passage check valve 63 and the second oil passage orifice 62. Fluctuations in hydraulic pressure to be supplied to the first oil passage 50a can be reduced because of passage via the second oil passage orifice 62. In addition, the second oil passage check valve 63 can prevent supply of oil from the first oil passage 50a to the second oil passage 60.

In the hydraulic control device 20 thus configured, when switching is made from the D range to the N range while the vehicle is stationary, for example, the linear solenoid valve SLU can output a hydraulic pressure, and the hydraulic pressure can be supplied to the linear solenoid valve SL1 via the second oil passage 60. That is, the line pressure $P_L$ which is supplied to the linear solenoid valve SLU is also generated during drive of the engine, and therefore also generated in the N range or the P range. Thus, when switching is made from the D range to the N range, the control section 100 (FIG. 1) regulates the line pressure $P_L$ and outputs the regulated pressure to the linear solenoid valve SLU. At a low vehicle speed such as a vehicle speed at which a so-called garage shift, in which range switching is performed from the D range to the N range or from the N range to the R range and in the opposite direction, is performed to park the vehicle or the like, for example, the lock-up clutch 10 is disengaged for fear of engine stalling. Therefore, the lock-up relay valve 90 is in the second state, and a hydraulic pressure output from the linear solenoid valve SLU is supplied to the second oil passage 60 via the lock-up relay valve 90, and supplied to the linear solenoid valve SL1 via the connection portion 61 and the first oil passage 50*a*.

In addition, the linear solenoid valve SLU outputs a hydraulic pressure at least until discharge of a hydraulic pressure to the hydraulic servo 22 by the linear solenoid valve SL1, which is performed along with switching from the D range to the N range, is finished, and thereafter stops outputting the hydraulic pressure. In the embodiment, a hydraulic pressure is supplied from the linear solenoid valve SLU to the linear solenoid valve SL1 for a predetermined time after switching is made from the D range to the N range. The predetermined time is determined to be equal to or more than a switching time until the linear solenoid valve SL1 regulates the D range pressure from the hydraulic servo 22 and discharges the regulated pressure from the drain port EX4 in the case where switching is made from the D range to the N range.

That is, the linear solenoid valve SL1 performs switching operation in which communication between the input port SL1*a* and the output port SL1*b* is gradually blocked and communication between the output port SL1*b* and the drain port EX4 is gradually allowed in accordance with switching from the D range to the N range. In this event, the D range pressure is no longer output from the range switching device 21. Therefore, a shock is caused when the clutch C-1 is abruptly disengaged with a hydraulic pressure in the hydraulic servo 22 abruptly released unless any measures are taken. Therefore, in the embodiment, a shock caused when the clutch C-1 is abruptly disengaged with a hydraulic pressure in the hydraulic servo 22 abruptly released is mitigated by supplying a hydraulic pressure from the linear solenoid valve SLU to the linear solenoid valve SL1 at least until switching operation of the linear solenoid valve SU is completed, that is, at least until communication between the input port SL1*a* and the output port SL1*b* is blocked and communication between the output port SL1*b* and the drain port EX4 is completely allowed in the linear solenoid valve SL1, When switching operation of the linear solenoid valve SL1 is completed, supply of a hydraulic pressure by the linear solenoid valve SLU is stopped.

Figure 4:
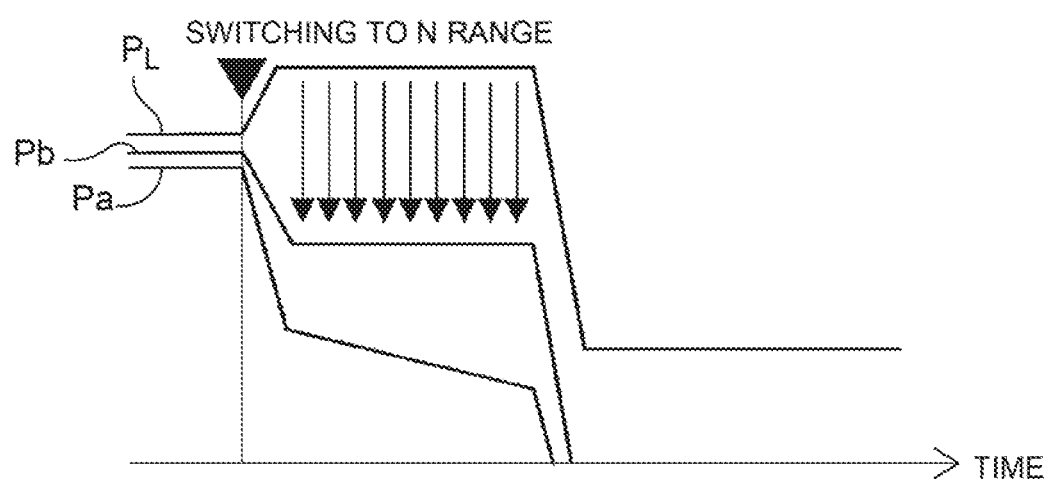
FIG. 4 is a time chart illustrating variations in line pressure, pressure supplied from a linear solenoid valve, and hydraulic pressure in a hydraulic servo for a clutch caused when switching is made from a forward range to a neutral range.

By supplying a hydraulic pressure from the linear solenoid valve SLU to the linear solenoid valve SL1 in the case where switching is made from the D range to the N range in this way, a hydraulic pressure Pa in the hydraulic servo 22 is gradually lowered as illustrated in FIG. 4. That is, when switching is made to the N range, the linear solenoid valve SLU regulates the line pressure $P_L$, and supplies a hydraulic pressure Pb to the linear solenoid valve SL1. As a result, the hydraulic pressure Pa in the hydraulic servo 22 can be gradually lowered as in FIG. 4. In the embodiment, as illustrated in FIG. 4, supply of the hydraulic pressure Pb from the linear solenoid valve SLU is stopped after the switching operation of the linear solenoid valve SL1 discussed above is completed and the hydraulic pressure Pa in the hydraulic servo 22 is released.

The timing to stop supply of a hydraulic pressure from the linear solenoid valve SLU may be the same as the completion of the switching operation of the linear solenoid valve SL1 discussed above, or may be a certain time thereafter. In the embodiment, the stop of supply of a hydraulic pressure from the linear solenoid valve SLU is controlled in accordance with the time. However, the stop of supply of a hydraulic pressure from the linear solenoid valve SLU may be controlled by a different method such as by stopping supply of a hydraulic pressure upon detecting completion of the switching operation of the linear solenoid valve SL1, for example.

As has been described above, the hydraulic control device for an automatic transmission (see FIGS. 3 and 5, for example) includes:

a range pressure switching section (21) that outputs a source pressure based on a hydraulic pressure from a hydraulic pressure generation source as a travel range pressure in the case where switching is made to a travel range (D range or R range), and that does not output the travel range pressure in the case where switching is made to a non-travel range (N range);

a first oil passage (50*a*, 70*a*) through which the travel range pressure output from the range pressure switching section (21) passes;

a first solenoid valve (SL1, SL3) connected to the first oil passage (50*a*, 70*a*), the first solenoid valve regulating the travel range pressure and supplying the regulated pressure to a hydraulic servo (22, 23) for a friction engagement element (C-1, C-3) to engage the friction engagement element (C-1, C-3) in the case where switching is made from the non-travel range to the travel range, and the first solenoid valve regulating the travel range pressure and discharging the regulated pressure from the hydraulic servo (22, 23) to disengage the friction engagement element (C-1, C-3) in the case where switching is made from the travel range to the non-travel range;

a first oil passage orifice (53, 73) provided in the first oil passage (50*a*, 70*a*) between the range pressure switching section (21) and the first solenoid valve (SL1, SL3);

a second oil passage (60, 80) connected to the first oil passage (50*a*, 70*a*) between the first solenoid valve (SL1, SL3) and the first oil passage orifice (53, 73);

a second solenoid valve (SLU, SR) that outputs a hydraulic pressure generated at least in the non-travel range when switching is made from the travel range to the non-travel range, and that can supply the hydraulic pressure to the first solenoid valve (SL1, SL3) via the second oil passage (60, 80); and a second oil passage check valve (63, 83) provided in the second oil passage (60, 80) between a connection portion (61, 81) with the first oil passage (50*a*, 70*a*) and the second solenoid valve (SLU, SR), the second oil passage check valve being configured such that a hydraulic pressure is supplied in a direction from the second solenoid valve (SLU, SR) toward the first oil passage (50*a*, 70*a*) and a hydraulic pressure is not supplied in the opposite direction.

In this way, with the hydraulic control device 20 according to the embodiment, a hydraulic pressure can be supplied to the linear solenoid valve SL1 by the linear solenoid valve SLU when switching is made from the D range to the N range. Therefore, it is possible to mitigate a shock caused when switching is made from the D range to the N range without providing an accumulator. Since it is not necessary to provide an accumulator for mitigating such a shock, the device can be downsized. In the case of the embodiment, in addition, the existing linear solenoid valve SLU which engages the lock-up clutch is commonly used to supply a hydraulic pressure to the linear solenoid valve SLU. Therefore, it is only necessary to provide the second oil passage 60, and it is not necessary to provide a new valve. Thus, it is possible to obtain the hydraulic control device 20 discussed above at a low cost in addition to suppressing an increase in size of the device.

In the case of a structure in which an accumulator is used according to the related art, the accumulator is varied in volume when a hydraulic pressure is charged to the clutches and the brakes when switching is made from the N range to the D range, which is disadvantageous in terms of response. In the case of the embodiment, in contrast, an accumulator is not provided, and therefore it is possible to improve the response of charge of a hydraulic pressure to the clutches and the brakes performed when switching is made from the N range to the D range.

In addition, the second oil passage 60 through which a hydraulic pressure is supplied from the linear solenoid valve SLU to the linear solenoid valve SL1 is connected between the linear solenoid valve SL1 and the delay mechanism 51. Therefore, a hydraulic pressure from the linear solenoid valve SLU can be mainly supplied to the linear solenoid valve SL1.

The hydraulic control device for an automatic transmission (see FIGS. 3 and 5, for example) further including a second oil passage orifice (62, 82) provided between the connection portion (61, 81) and the second solenoid valve (SLU, SR).

That is, the second oil passage orifice 62 is provided in the second oil passage 60 between the connection portion 61 with the first oil passage 50 and the linear solenoid valve SLU. Therefore, fluctuations in hydraulic pressure to be supplied from the linear solenoid valve SLU to the linear solenoid valve SL1 can be reduced to improve the controllability of the hydraulic servo 22. In addition, the second oil passage check valve 63 is provided between the connection portion 61 and the linear solenoid valve SLU. Therefore, it is possible to prevent oil from flowing from the first oil passage 50 to the second oil passage 60, and to prevent the D range pressure from acting on the linear solenoid valve SLU from the first oil passage 50 via the second oil passage 60 even in the case where the D range pressure is output from the range switching device 21.

The hydraulic control device for an automatic transmission (see FIGS. 3 and 5, for example) further including a third oil passage (50b, 70b) that extends in parallel with the first oil passage (50a, 70a) to bypass the first oil passage orifice (53, 73); and the third oil passage (50b, 70b) is provided with a first oil passage check valve (52, 72) through which a hydraulic pressure is supplied in a direction from the range pressure switching section (21) toward the first solenoid valve (SL1, SL3) and through which a hydraulic pressure is not supplied in the opposite direction.

Consequently, the D range pressure supplied from the range switching device 21 can be sufficiently supplied from the bypass oil passage 50b which is provided with the first oil passage check valve 52 to the linear solenoid valve SL1. Moreover, in the case where the D range pressure is discharged from the linear solenoid valve SL1 to the range switching device 21, passage of the hydraulic pressure through the first oil passage 50a which is provided with the first oil passage orifice 53 can prevent an abrupt loss of hydraulic pressure in the hydraulic servo 22.

The hydraulic control device for an automatic transmission (see FIGS. 3 and 5, for example), in addition, wherein the second solenoid valve (SLU, SR) outputs a hydraulic pressure at least until discharge of a hydraulic pressure from the hydraulic servo (22, 23) by the first solenoid valve (SL1, SL3), which is performed along with switching from the travel range to the non-travel range, is finished, and thereafter stops outputting the hydraulic pressure. Consequently, a shock caused when switching is made from the D range to the N range can be further mitigated.

The hydraulic control device for an automatic transmission (see FIG. 3, for example), in addition, wherein the second solenoid valve (SLU) is a lock-up solenoid valve that regulates an engagement pressure for a lock-up clutch (10) of a fluid transmission apparatus (7) disposed in a power transfer path between an output shaft (11) of an engine and an input shaft (12) of an automatic speed change mechanism (2).

The hydraulic control device for an automatic transmission (see FIG. 3, for example) further including a lock-up control valve (90) that can supply a supplied hydraulic pressure to the lock-up clutch (10), and that can be switched between a first state in which the lock-up clutch (10) is engaged and a second state in which the lock-up clutch (10) is disengaged; and wherein the lock-up solenoid valve (SLU) can supply an output hydraulic pressure to the first solenoid valve (SL1) via the second oil passage when the lock-up control valve (90) is in the second state.

The hydraulic control device for an automatic transmission (see FIG. 3, for example), further, wherein the lock-up solenoid valve (SLU) can supply a hydraulic pressure to the lock-up control valve (90); and the lock-up control valve (90) can output a hydraulic pressure supplied from the lock-up solenoid valve (SLU) as the engagement pressure in the first state, and supply a hydraulic pressure supplied from the lock-up solenoid valve (SLU) to the first solenoid valve (SL1) via the second oil passage (60) in the second state.

Consequently, an increase in number of components can be suppressed. That is, in the case of a vehicle speed at which switching is made from the D range to the N range, the lock-up clutch 10 is not engaged for fear of engine stalling. Therefore, the linear solenoid valve SLU is not used to engage the lock-up clutch 10. Therefore, the linear solenoid valve SLU can also be used as a valve that supplies a hydraulic pressure to the linear solenoid valve SL1 when switching is made from the D range to the N range, which can suppress an increase in number of components compared to a case where such a valve is provided exclusively.

The hydraulic control device for an automatic transmission (see FIGS. 3 and 5, for example), in addition, wherein at least one of the first solenoid valve (SL1, SL3) and the second solenoid valve (SLU, SR) is of a normally closed type. Consequently, at least one of the linear solenoid valve SL1 and the linear solenoid valve SLU is of a normally closed type. Therefore, in the case where the linear solenoid valve SL1 and the linear solenoid valve SLU are not energized when switching is made to the N range, it is possible to prevent supply of a hydraulic pressure to the hydraulic servo 22, and to establish the N range.

In the embodiment, both the linear solenoid valve SL1 and the linear solenoid valve SLU are of a normally closed type. Therefore, in the case where the linear solenoid valve SL1 and the linear solenoid valve SLU are subjected to an off failure due to a wire breakage when switching is made to the N range, it is possible to prevent supply of a hydraulic pressure to the hydraulic servo 22, and to establish the N range. It is only necessary that at least one of the linear solenoid valve SL1 and the linear solenoid valve SLU should be of a normally closed type. That is, if the linear solenoid valve SL1 is of a normally closed type, supply of a hydraulic pressure to the hydraulic servo 22 is blocked irrespective of the state of the other valves at the time of an off failure, which makes it possible to establish the N range. Meanwhile, if the linear solenoid valve SLU is of a normally closed type, first, supply of a hydraulic pressure from the linear solenoid valve SLU is blocked because of an off failure. If the range switching device 21 has been switched to the N range, the D range pressure is not supplied to the linear solenoid valve SL1. Therefore, a hydraulic pressure is not supplied to the hydraulic servo 22, which makes it possible to establish the N range. In the case where an all-off failure has occurred, the range switching device 21 is switched to the N range as discussed above, and the D range pressure is not output from the range switching device 21, which establishes the N range.

In the case of the configuration illustrated in FIG. 3, the linear solenoid valve SLU directly supplies a hydraulic pressure to the lock-up clutch 10 via the lock-up relay valve 90. It should be noted, however, that the linear solenoid valve SLU may be configured to control a lock-up control valve (lock-up control valve) that switches the lock-up clutch 10. For example, a configuration in which a hydraulic pressure is supplied into a device that includes the torque converter 7 and the lock-up clutch 10 through two oil passages and the lock-up clutch 10 is engaged and disengaged by switching the direction of circulation of the hydraulic pressure using the lock-up control valve is conceivable. In the configuration, a hydraulic pressure such as a line pressure is regulated by the lock-up control valve, and supplied to the two oil passages. The direction of circulation of the hydraulic pressure is switched by the linear solenoid valve SLU by controlling the lock-up control valve. Specifically, in the case where a hydraulic pressure is output from the linear solenoid valve SLU, the lock-up control valve is switched to the first state to engage the lock-up clutch 10. In the case where a hydraulic pressure is not output from the linear solenoid valve SLU, on the other hand, the lock-up control valve is switched to the second state to disengage the lock-up clutch 10.

In such a configuration, if the lock-up control valve has been locked so as not to be switched by a different hydraulic pressure when the lock-up clutch 10 is not engaged, a hydraulic pressure from the linear solenoid valve SLU can be supplied to the linear solenoid valve SL1. Specifically, if the lock-up control valve is maintained in a state (second state) in which the lock-up clutch 10 is disengaged in the case where a hydraulic pressure is not output from the linear solenoid valve SLU to the lock-up control valve, a hydraulic pressure from the linear solenoid valve SLU can be supplied to the linear solenoid valve SL1. In a specific configuration, for example, a hydraulic pressure from a different solenoid valve can be supplied to the lock-up control valve so as to oppose a hydraulic pressure from the linear solenoid valve SLU. Thus, also in this case, in the same manner as discussed above, the linear solenoid valve SLU can also be used as a valve that supplies a hydraulic pressure to the linear solenoid valve SL1 when switching is made from the D range to the N range.

Second Embodiment

A second embodiment will be described with reference to FIG. 5. In the embodiment, unlike the first embodiment discussed above, in the case where switching is made from the R range which is a travel range to the N range, a hydraulic pressure is supplied from a linear solenoid valve SR to a linear solenoid valve SL3 for the third clutch C-3 which is engaged to establish the first reverse speed. The other components and functions of the embodiment are similar to those of the first embodiment discussed above. Therefore, identical components are given identical reference numerals to omit or simplify description thereof and mainly describe differences from the first embodiment below.

A hydraulic control device 20A according to the embodiment includes the range switching device 21, linear solenoid valves SL3, SR, and SLB2, a hydraulic servo 23 that engages and disengages the third clutch C-3, a hydraulic servo 24 that engages and disengages the second brake B-2, a fail-safe valve 110, and so forth. In addition, a shift control circuit 120 that hydraulically controls establishment of a plurality of shift speeds includes various valves that control the clutches and the brakes such as the linear solenoid valves SL3 and SLB2. In the embodiment, the second brake B-2 is engaged to establish the first forward speed (1st), the neutral (N), and the first reverse speed (R). The range switching device 21 is similar to that according to the first embodiment. It should be noted, however, that in the case where the driver operates the shift lever from the R range to the N range which is a non-travel range, the range switching device 21 operates as follows.

First, in the case where the driver operates the shift lever from the R range to the N range which is a non-travel range, the first solenoid valve RS1 is turned off and the second solenoid valve RS2 is turned on so that the first switching valve 30 is switched to the first position (left-half position) and the second switching valve 40 is switched to the second position (right-half position). Then, the line pressure $P_L$ which has been supplied to the input port a of the first switching valve 30 is output from the first output port b1, and supplied to the first input port c1 of the second switching valve 40. In the second switching valve 40, the first input port c1 and the first output port d1 do not communicate with each other, and the second input port c2 and the second output port d2 communicate with each other. In addition, the second output port b2 of the first switching valve 30 which is connected to the second input port c2 communicates with the drain port EX2. Therefore, the R range pressure which has been supplied from the second output port b2 is discharged from the drain port EX2 via the second output port d2, the second input port c2, and the second output port b2 so that the R range pressure is not output.

Next, in the case where the driver operates the shift lever from the R range to the P range which is a non-travel range, the first solenoid valve RS1 is turned on and the second solenoid valve RS2 is turned off so that the first switching valve 30 is switched to the second position (right-half position) and the second switching valve 40 is switched to the first position (left-half position). Then, the line pressure $P_L$ which has been supplied to the input port a of the first switching valve 30 is output from the second output port b2, and supplied to the second input port c2 of the second switching valve 40. In the second switching valve 40, the second input port c2 and the second output port d2 do not communicate with each other, and the second output port d2 and the drain port EX3 communicate with each other. Therefore, the R range pressure which has been supplied from the second output port b2 is discharged from the drain port EX3 via the second output port d2 so that the R range pressure is not output.

The linear solenoid valve SL3 (first solenoid valve) has an SL3a that receives the D range pressure or the R range pressure, an output port SL3b that regulates the D range pressure or the R range pressure and outputs the regulated pressure to the hydraulic servo 23 when energized, and a drain port EX5. When establishing a forward speed or a reverse speed, the linear solenoid valve SL3 regulates the D range pressure or the R range pressure and outputs the regulated pressure to the hydraulic servo 23 to engage the third clutch C-3. As illustrated in FIG. 2 discussed above, the third clutch C-3 is engaged to establish the third and seventh forward speeds and the first reverse speed, and disengaged to establish the neutral.

The linear solenoid valve SR (second solenoid valve) is a failure solenoid valve that outputs a hydraulic pressure at the time of a failure, and has an input port SRa that receives a modulator pressure $P_{mod}$ and an output port SRb that regulates the modulator pressure $P_{mod}$ and outputs the regulated pressure when energized. The output port SRb is connected to a relay valve and a control valve (not illustrated). The linear solenoid valve SR outputs a signal pressure to the valves. The modulator pressure $P_{mod}$ is a hydraulic pressure obtained by a solenoid modulator valve (not illustrated) by regulating the line pressure $P_L$ to be generally constant when the line pressure $P_L$ is equal to or more than a predetermined pressure.

The linear solenoid valve SLB2 (third solenoid valve) has an output port SLB2b that regulates the D range pressure or the R range pressure and outputs the regulated pressure to the hydraulic servo 24 for the second brake B-2. Unlike FIG. 2 discussed above, the second brake B-2 is engaged to establish the first forward speed, the neutral, and the first reverse speed. The linear solenoid valve SR is of a so-called normally open type that outputs a hydraulic pressure when not energized. Both the linear solenoid valves SL3 and SLB2 are of a so-called normally closed type that does not output a hydraulic pressure when not energized.

The fail-safe valve 110 can be switched between an output position (left-half position in FIG. 5) at which a hydraulic pressure is output to the shift control circuit 120 and a non-output position (right-half position in FIG. 5) at which a hydraulic pressure is not output to the shift control circuit 120. The fail-safe valve 110 is switched to the output position during a failure. For example, when the fail-safe valve 110 is switched to the output position with a plurality of linear solenoid valves or all the linear solenoid valves subjected to an off failure, a forward speed such as the third forward speed or the reverse speed can be established, for example, and the vehicle can travel in a degenerate manner. Such a fail-safe valve 110 has a spool 111 that is movable between the output position and the non-output position, and a spring 112 that serves as an urging member that urges the spool 111 toward the non-output position. In addition, the fail-safe valve 110 has ports such as input ports 113a, 114a, 115a, and 116a, output ports 114b and 115b, and so forth.

The input port 113a is connected to the output port SL3b of the linear solenoid valve SR. A forward range pressure $P_D$ is supplied to the input port 114a. A reverse range pressure $P_R$ is supplied to the input port 115a. The forward range pressure $P_D$ is a hydraulic pressure output from a manual shift valve (not illustrated) using the line pressure as the source pressure when the shift position is changed to the D range on the basis of an operation of a shift lever provided at the driver's seat (not illustrated). The reverse range pressure $P_R$ is a hydraulic pressure output from the manual shift valve using the line pressure as the source pressure when the shift position is changed to the R range on the basis of an operation of the shift lever. The input port 116a is connected to the output port SLB2b. The output ports 114b and 115b communicate with the input ports 114a and 115a, respectively, with the spool 111 at the left-half position, and do not communicate with the input ports 114a and 115a, respectively, with the spool 111 at the right-half position.

The fail-safe valve 110 thus configured is positioned at the output position (left-half position) when a hydraulic pressure is output from the linear solenoid valve SR and a hydraulic pressure is not output from the linear solenoid valve SLB2. That is, when a hydraulic pressure is output from the linear solenoid valve SR and a hydraulic pressure is not output from the linear solenoid valve SLB2, a hydraulic pressure is input to the input port 113a, and a hydraulic pressure is not input to the input port 116a. Then, the spool 111 is moved downward in FIG. 5 to the left-half position.

When a hydraulic pressure is output from the linear solenoid valve SLB2, on the other hand, the fail-safe valve 110 is positioned at the non-output position (right-half position) irrespective of whether a hydraulic pressure is output from the linear solenoid valve SR. That is, when a hydraulic pressure is output from the linear solenoid valve SLB2, a hydraulic pressure is input to the input port 116a, which moves the spool 111 upward in FIG. 5 in cooperation with the urging force of the spring 112 even if a hydraulic pressure is input to the input port 113a.

A first oil passage 70a is disposed between the range switching device 21 and the linear solenoid valve SL3. That is, the first oil passage 70a is connected to the second output port d1 of the second switching valve 40 of the range switching device 21 and the input port SL3a of the linear solenoid valve SL3. Therefore, the R range pressure output from the range switching device 21 is supplied to the linear solenoid valve SL3 through the first oil passage 70a. The first oil passage 70a is provided with a first oil passage orifice 73. In addition, a bypass oil passage 70b (third oil passage) is provided between the range switching device 21 and the linear solenoid valve SL3. The bypass oil passage 70b extends in parallel with the first oil passage 70a to bypass the first oil passage orifice 73. That is, both end portions of the bypass oil passage 70b are connected to the first oil passage 70a on both sides of the first oil passage orifice 73. The bypass oil passage 70b is provided with a first oil passage check valve 72 through which a hydraulic pressure is supplied in the direction from the range switching device 21 toward the linear solenoid valve SL3 and through which a hydraulic pressure is not supplied in the opposite direction.

By providing a delay mechanism 71 that has the first oil passage orifice 73 and the first oil passage check valve 72 between the range switching device 21 and the linear solenoid valve SL3 in this way, pressure variations are delayed in the case where the R range pressure is discharged from the linear solenoid valve SL3 compared to a case where the R range pressure is supplied to the linear solenoid valve SL3. Operation of the delay mechanism 71 is similar to that of the delay mechanism 51 according to the first embodiment, and therefore is not described in detail.

In addition, a second oil passage 80 is connected to the first oil passage 70a between the linear solenoid valve SL3 and the delay mechanism 71. The second oil passage 80 is also connected to the linear solenoid valve SR. That is, the second oil passage 80 is connected to the output port SRb of the linear solenoid valve SR, and connected to the first oil passage 70a by a connection portion 81. In addition, the output port SRb of the linear solenoid valve SR is also connected to the input port 113a of the fail-safe valve 110. Thus, a hydraulic pressure output by the linear solenoid valve SR by regulating the modulator pressure $P_{mod}$ can be supplied to the fail-safe valve 110, and can be supplied to the linear solenoid valve SL3 via the second oil passage 80, the connection portion 81, and the first oil passage 70a when the fail-safe valve 110 is positioned at the non-output position.

In addition, a second oil passage orifice 82 and a second oil passage check valve 83 are provided in the second oil passage 80 between the connection portion 81 with the first oil passage 70a and the linear solenoid valve SR, sequentially from the connection portion 81 side. The second oil passage check valve 83 is configured such that a hydraulic pressure is supplied in the direction from the linear solenoid valve SR toward the first oil passage 70a and a hydraulic pressure is not supplied in the opposite direction. Thus, a hydraulic pressure supplied from the linear solenoid valve SR is supplied to the first oil passage 70a side via the second oil passage check valve 83 and the second oil passage orifice 82. Operation of the second oil passage orifice 82 and the second oil passage check valve 83 is also similar to that of the second oil passage orifice 62 and the second oil passage check valve 63 according to the first embodiment.

In the hydraulic control device 20A thus configured, when switching is made from the R range to the N range while the vehicle is stationary, for example, the linear solenoid valve SR can output a hydraulic pressure, and the hydraulic pressure can be supplied to the linear solenoid valve SL3 via the second oil passage 80. That is, the modulator pressure $P_{mod}$ which is supplied to the linear solenoid valve SR is also generated during drive of the engine, and therefore also generated in the N range. Thus, when switching is made from the R range to the N range, the control section 100 (FIG. 1) regulates the modulator pressure $P_{mod}$ and outputs the regulated pressure to the linear solenoid valve SR. When each of the 1st, N, and R ranges is established, the second brake B-2 is engaged. That is, the linear solenoid valve SLB2 which outputs a hydraulic pressure to the hydraulic servo 24 for the second brake B-2 is outputting a hydraulic pressure. Therefore, a hydraulic pressure is output to the input port 116a of the fail-safe valve 110, and the fail-safe valve 110 is not switched to the output position even if a hydraulic pressure is output from the linear solenoid valve SR. Thus, even if the linear solenoid valve SR outputs a hydraulic pressure when switching is made from the R range to the N range, the fail-safe valve 110 is not switched to the output position. In other words, when switching is made from the R range to the N range, a hydraulic pressure output from the linear solenoid valve SLB2 acts on the fail-safe valve 110 as a pressure that opposes a hydraulic pressure output from the linear solenoid valve SR. Therefore, it is possible to prevent accidental switching of the fail-safe valve 110 to the output position to which the fail-safe valve 110 is switched during an off failure. Consequently, the output hydraulic pressure can be supplied to the linear solenoid valve SL3 via the second oil passage 80, the connection portion 81, and the first oil passage 70a.

In addition, the linear solenoid valve SR outputs a hydraulic pressure at least until discharge of a hydraulic pressure to the hydraulic servo 23 by the linear solenoid valve SL3, which is performed along with switching from the R range to the N range, is finished, and thereafter stops outputting the hydraulic pressure. In the embodiment, a hydraulic pressure is supplied from the linear solenoid valve SR to the linear solenoid valve SL3 for a predetermined time after switching is made from the R range to the N range. The predetermined time is determined to be equal to or more than a switching time until the linear solenoid valve SL3 regulates the R range pressure from the hydraulic servo 23 and discharges the regulated pressure from the drain port EX5 in the case where switching is made from the R range to the N range. Operation of the linear solenoid valve SR to supply a hydraulic pressure to the linear solenoid valve SL3 and stop such supply is similar to operation of the linear solenoid valve SLU to supply a hydraulic pressure to the linear solenoid valve SL1 and stop such supply according to the first embodiment.

In this way, with the hydraulic control device 20A according to the embodiment, a hydraulic pressure can be supplied to the linear solenoid valve SL3 by the linear solenoid valve SR when switching is made from the R range to the N range, Therefore, it is possible to mitigate a shock caused when switching is made from the R range to the N range without providing an accumulator.

The hydraulic control device for an automatic transmission (see FIG. 5, for example), in addition, wherein the second solenoid valve (SR) is a failure solenoid valve that outputs a hydraulic pressure at a time of a failure.

The hydraulic control device for an automatic transmission (see FIG. 5, for example) wherein a fail-safe valve (110) that can be switched between an output position, at which a hydraulic pressure is output to a shift control circuit (120) that hydraulically controls establishment of a plurality of shift speeds, and a non-output position, at which a hydraulic pressure is not output to the shift control circuit (120), the fail-safe valve being switched to the output position during a failure, and a third solenoid valve (SLB2) that regulates a hydraulic pressure and outputs the regulated pressure to a hydraulic servo (24) for a friction engagement element (B-2) engaged to establish a first forward speed, a neutral, and a first reverse speed, and wherein the fail-safe valve (110) is positioned at the output position when a hydraulic pressure is output from the failure solenoid valve (SR) and a hydraulic pressure is not output from the third solenoid valve (SLB2), and positioned at the non-output position when a hydraulic pressure is output from the third solenoid valve (SLB2); and the failure solenoid valve can supply an output hydraulic pressure to the first solenoid valve via the second oil passage when the fail-safe valve is positioned at the non-output position. Consequently, unnecessary switching of the fail-safe valve 110 can be prevented with a simple configuration. Other configurations and functions are similar to those according to the first embodiment discussed above.

Other Embodiments

In each of the embodiments discussed above, the technology is applied to an automatic transmission that establishes a first forward speed (1st) to an eighth forward speed (8th). However, the technology may also be applied to other multi-stage automatic transmissions such as an automatic transmission that can establish six forward speeds or nine forward speeds or more, continuously variable transmissions (CVTs), hybrid drive devices, and so forth, for example. In each of the embodiments discussed above, in addition, switching is made from the D range to the N range or from the R range to the N range. However, the technology may also be applied to a case where switching is made from the D range to the P range or from the R range to the P range.

In each of the embodiments discussed above, the range switching device 21 of a shift-by-wire system is applied to the technology as the range pressure switching section. However, the range pressure switching section may be a manual shift valve or the like, for example. In addition, the friction engagement element to be controlled in order to mitigate a shock caused in the case where switching is made from the D range or the R range to the N range may be other than the first clutch C-1 and the third clutch C-3 discussed above. For example, in the case where switching is made from the D range to the N range with a forward speed that is higher than the first speed established, for example, a friction engagement element that is engaged to establish the forward speed is to be controlled in the same manner as in each of the embodiments discussed above.

Furthermore, the hydraulic pressure which is supplied from the second solenoid valve to the first solenoid valve which controls such a friction engagement element when switching is made from the D range or the R range to the N range may be a secondary pressure, a lubrication pressure, or the like, other than the line pressure or the modulator pressure discussed above, as long as a necessary hydraulic pressure can be secured. For example, in the case where the technology is applied to a CVT of a belt type, a belt holding pressure may be regulated. In short, it is only necessary that the pressure should be at least a hydraulic pressure generated in a non-travel range such as the N range.

INDUSTRIAL APPLICABILITY

The hydraulic control device for an automatic transmission can be used for vehicles such as passenger cars and trucks.

The invention claimed is:

1. A hydraulic control device for an automatic transmission, comprising:
   a range pressure switcher that outputs a source pressure based on a hydraulic pressure from a hydraulic pressure generation source as a travel range pressure in the case where switching is made to a travel range, and that does not output the travel range pressure in the case where switching is made to a non-travel range;
   a first oil passage through which the travel range pressure output from the range pressure switcher passes;
   a first solenoid valve connected to the first oil passage, the first solenoid valve regulating the travel range pressure and supplying the regulated pressure to a hydraulic servo for a friction engagement element to engage the friction engagement element in the case where switching is made from the non-travel range to the travel range, and the first solenoid valve regulating the travel range pressure and discharging the regulated pressure from the hydraulic servo to disengage the friction engagement element in the case where switching is made from the travel range to the non-travel range;
   a first oil passage orifice provided in the first oil passage between the range pressure switcher and the first solenoid valve;
   a second oil passage connected to the first oil passage between the first solenoid valve and the first oil passage orifice;
   a second solenoid valve that outputs a hydraulic pressure generated at least in the non-travel range when switching is made from the travel range to the non-travel range, and that can supply the hydraulic pressure to the first solenoid valve via the second oil passage; and
   a second oil passage check valve provided in the second oil passage between a connection portion with the first oil passage and the second solenoid valve, the second oil passage check valve being configured such that a hydraulic pressure is supplied in a direction from the second solenoid valve toward the first oil passage and a hydraulic pressure is not supplied in the opposite direction.

2. The hydraulic control device for an automatic transmission according to claim 1, further comprising a second oil passage orifice provided between the connection portion and the second solenoid valve.

3. The hydraulic control device for an automatic transmission according to claim 2, further comprising:
   a third oil passage that extends in parallel with the first oil passage to bypass the first oil passage orifice, wherein
   the third oil passage is provided with a first oil passage check valve through which a hydraulic pressure is supplied in a direction from the range pressure switcher toward the first solenoid valve and through which a hydraulic pressure is not supplied in the opposite direction.

4. The hydraulic control device for an automatic transmission according to claim 3, wherein the second solenoid valve outputs a hydraulic pressure at least until discharge of a hydraulic pressure from the hydraulic servo by the first solenoid valve, which is performed along with switching from the travel range to the non-travel range, is finished, and thereafter stops outputting the hydraulic pressure.

5. The hydraulic control device for an automatic transmission according to claim 4, wherein the second solenoid valve is a lock-up solenoid valve that regulates an engagement pressure for a lock-up clutch of a fluid transmission apparatus disposed in a power transfer path between an output shaft of an engine and an input shaft of an automatic speed change mechanism.

6. The hydraulic control device for an automatic transmission according to claim 5, by further comprising:
   a lock-up control valve that can supply a supplied hydraulic pressure to the lock-up clutch, and that can be switched between a first state in which the lock-up clutch is engaged and a second state in which the lock-up clutch is disengaged, wherein
   the lock-up solenoid valve can supply an output hydraulic pressure to the first solenoid valve via the second oil passage when the lock-up control valve is in the second state.

7. The hydraulic control device for an automatic transmission according to claim 6, wherein:
   the lock-up solenoid valve can supply a hydraulic pressure to the lock-up control valve; and
   the lock-up control valve can output a hydraulic pressure supplied from the lock-up solenoid valve as the engagement pressure in the first state, and supply a hydraulic pressure supplied from the lock-up solenoid valve to the first solenoid valve via the second oil passage in the second state.

8. The hydraulic control device for an automatic transmission according to claim 7, wherein at least one of the first solenoid valve and the second solenoid valve is of a normally closed type.

9. The hydraulic control device for an automatic transmission according to claim 4, wherein the second solenoid valve is a failure solenoid valve that outputs a hydraulic pressure at a time of a failure.

10. The hydraulic control device for an automatic transmission according to claim 9, further comprising:
    a fail-safe valve that can be switched between an output position, at which a hydraulic pressure is output to a shift control circuit that hydraulically controls establishment of a plurality of shift speeds, and a non-output position, at which a hydraulic pressure is not output to the shift control circuit, the fail-safe valve being switched to the output position during a failure; and
    a third solenoid valve that regulates a hydraulic pressure and outputs the regulated pressure to a hydraulic servo for a friction engagement element engaged to establish a first forward speed, a neutral, and a first reverse speed, wherein:

the fail-safe valve is positioned at the output position when a hydraulic pressure is output from the failure solenoid valve and a hydraulic pressure is not output from the third solenoid valve, and positioned at the non-output position when a hydraulic pressure is output from the third solenoid valve; and the failure solenoid valve can supply an output hydraulic pressure to the first solenoid valve via the second oil passage when the fail-safe valve is positioned at the non-output position.

11. The hydraulic control device for an automatic transmission according to claim 10, wherein at least one of the first solenoid valve and the second solenoid valve is of a normally closed type.

12. The hydraulic control device for an automatic transmission according to claim 1, further comprising:

a third oil passage that extends in parallel with the first oil passage to bypass the first oil passage orifice, wherein the third oil passage is provided with a first oil passage check valve through which a hydraulic pressure is supplied in a direction from the range pressure switcher toward the first solenoid valve and through which a hydraulic pressure is not supplied in the opposite direction.

13. The hydraulic control device for an automatic transmission according to claim 1, wherein the second solenoid valve outputs a hydraulic pressure at least until discharge of a hydraulic pressure from the hydraulic servo by the first solenoid valve, which is performed along with switching from the travel range to the non-travel range, is finished, and thereafter stops outputting the hydraulic pressure.

14. The hydraulic control device for an automatic transmission according to claim 1, wherein the second solenoid valve is a lock-up solenoid valve that regulates an engagement pressure for a lock-up clutch of a fluid transmission apparatus disposed in a power transfer path between an output shaft of an engine and an input shaft of an automatic speed change mechanism.

15. The hydraulic control device for an automatic transmission according to claim 14, further comprising:

a lock-up control valve that can supply a supplied hydraulic pressure to the lock-up clutch, and that can be switched between a first state in which the lock-up clutch is engaged and a second state in which the lock-up clutch is disengaged, wherein the lock-up solenoid valve can supply an output hydraulic pressure to the first solenoid valve via the second oil passage when the lock-up control valve is in the second state.

16. The hydraulic control device for an automatic transmission according to claim 15, wherein:

the lock-up solenoid valve can supply a hydraulic pressure to the lock-up control valve; and the lock-up control valve can output a hydraulic pressure supplied from the lock-up solenoid valve as the engagement pressure in the first state, and supply a hydraulic pressure supplied from the lock-up solenoid valve to the first solenoid valve via the second oil passage in the second state.

17. The hydraulic control device for an automatic transmission according to claim 1, wherein the second solenoid valve is a failure solenoid valve that outputs a hydraulic pressure at a time of a failure.

18. The hydraulic control device for an automatic transmission according to claim 17, further comprising:

a fail-safe valve that can be switched between an output position, at which a hydraulic pressure is output to a shift control circuit that hydraulically controls establishment of a plurality of shift speeds, and a non-output position, at which a hydraulic pressure is not output to the shift control circuit, the fail-safe valve being switched to the output position during a failure; and a third solenoid valve that regulates a hydraulic pressure and outputs the regulated pressure to a hydraulic servo for a friction engagement element engaged to establish a first forward speed, a neutral, and a first reverse speed, wherein:

the fail-safe valve is positioned at the output position when a hydraulic pressure is output from the failure solenoid valve and a hydraulic pressure is not output from the third solenoid valve, and positioned at the non-output position when a hydraulic pressure is output from the third solenoid valve; and the failure solenoid valve can supply an output hydraulic pressure to the first solenoid valve via the second oil passage when the fail-safe valve is positioned at the non-output position.

19. The hydraulic control device for an automatic transmission according to claim 1, wherein at least one of the first solenoid valve and the second solenoid valve is of a normally closed type.

* * * * *